United States Patent [19]

Takeda et al.

[11] Patent Number: 4,865,429

[45] Date of Patent: Sep. 12, 1989

[54] APPARATUS FOR SUPPRESSING BACKWARD PROPAGATION ALONG AN OPTICAL PATH, COMPRISING MAGNETIC CONFIGURATIONS THAT IMPROVE THE FARADAY EFFECT

[75] Inventors: Shigeru Takeda; Satoshi Makio, both of Kumagaya, Japan

[73] Assignee: Hitachi Metals, Ltd., Tokyo, Japan

[21] Appl. No.: 156,845

[22] Filed: Feb. 17, 1988

[30] Foreign Application Priority Data

Feb. 17, 1987 [JP] Japan .................................. 62-34165
Feb. 27, 1987 [JP] Japan .................................. 62-44469

[51] Int. Cl.$^4$ .............................................. G02F 1/09
[52] U.S. Cl. .................................................. 350/375
[58] Field of Search ............... 350/355, 375, 376, 377, 350/378

[56] References Cited

FOREIGN PATENT DOCUMENTS 57-62024  4/1982  Japan .................................. 350/375

*Primary Examiner*—Bruce Y. Arnold
*Assistant Examiner*—David J. Edmondson
*Attorney, Agent, or Firm*—Finnegan, Henderson, Farabow, Garrett & Dunner

[57] ABSTRACT

An optical isolator comprising a cylindrical magnet magnetized in a direction parallel to the axis of rotational symmetry thereof, a Faraday rotator disposed in a center space of the cylindrical magnet, a pair of beam splitters capable of serving as a polarizer or an analyzer arranged on both sides of said Faraday rotator with inclination of 45° relative to each other, characterized in that the outer diameter Do, the inner diameter Di and the length L of the cylindrical magnet are in the range defined by $$0.9 \frac{\alpha^{2/3}}{\sqrt{\alpha^{2/3} + 1}} \leq \frac{L}{Di} \leq 1.1\alpha^{2/5} \sqrt{\frac{\alpha^{6/5} - 1}{\alpha^{4/5} - 1}}$$

where $\alpha = Do/Di$.

In the case of a multi-stage optical isolator, the Faraday rotators and the beam splitters are arranged alternately in tandem, and any two adjacent cylindrical magnets are arranged with their magnetic poles of the same polarity facing each other.

6 Claims, 6 Drawing Sheets

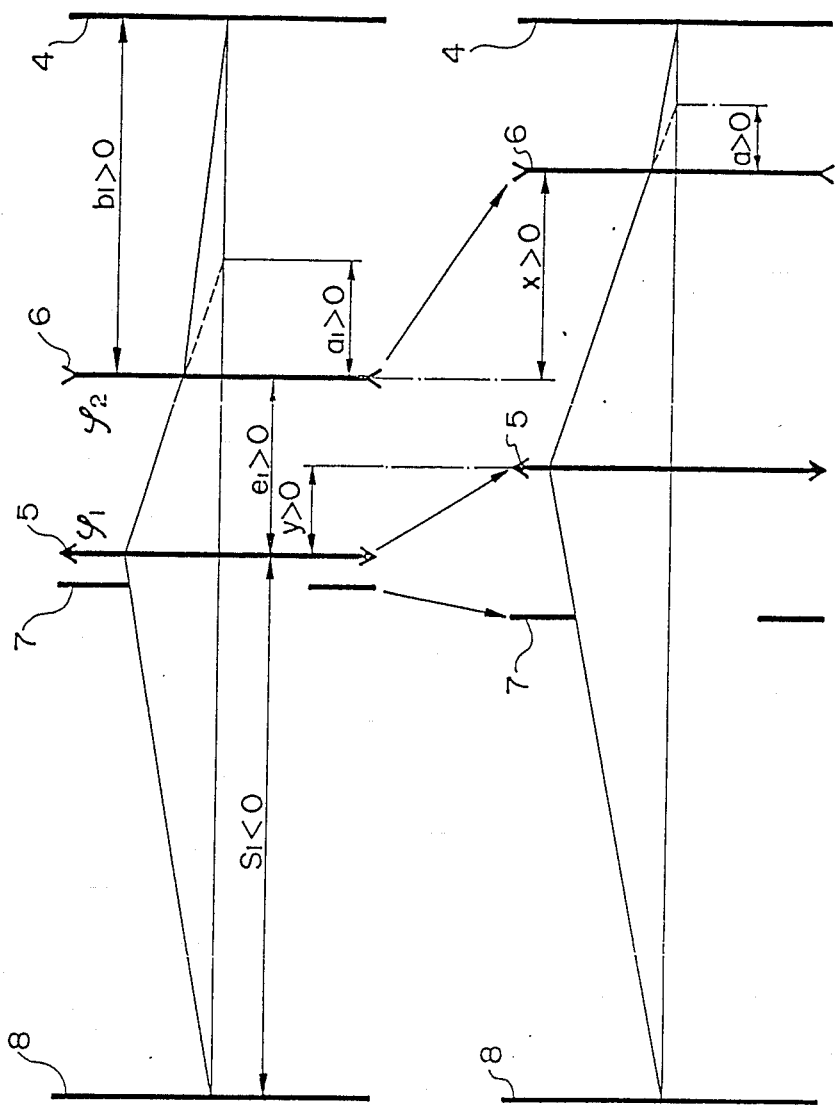

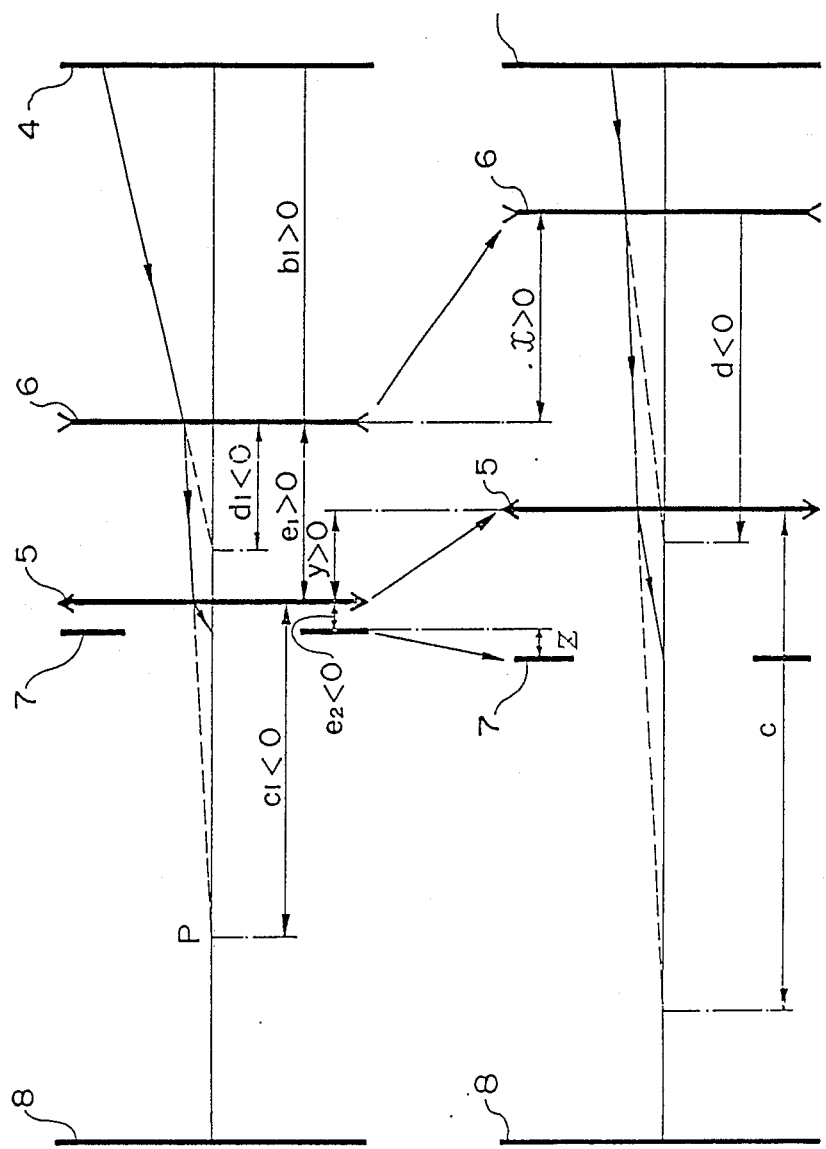

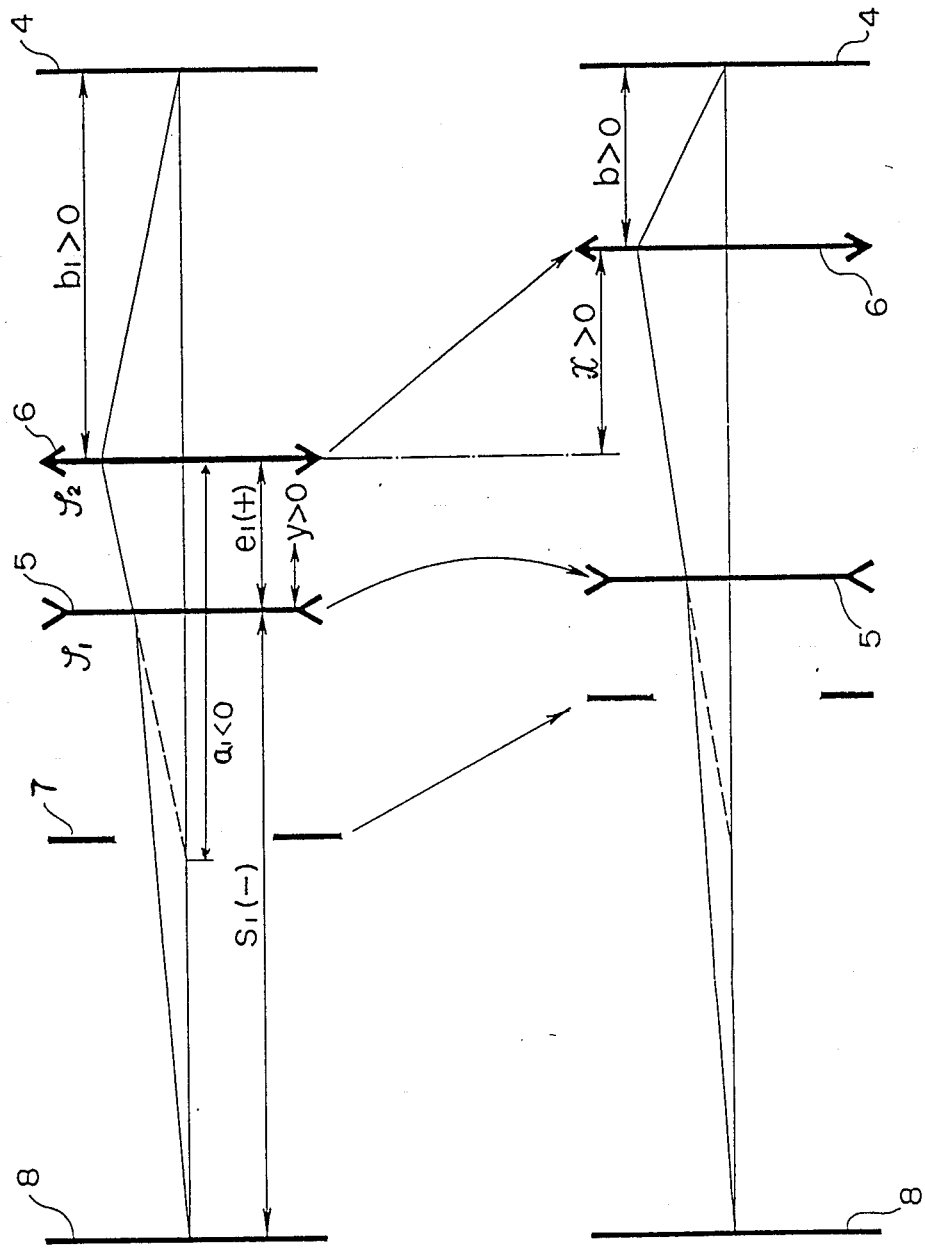

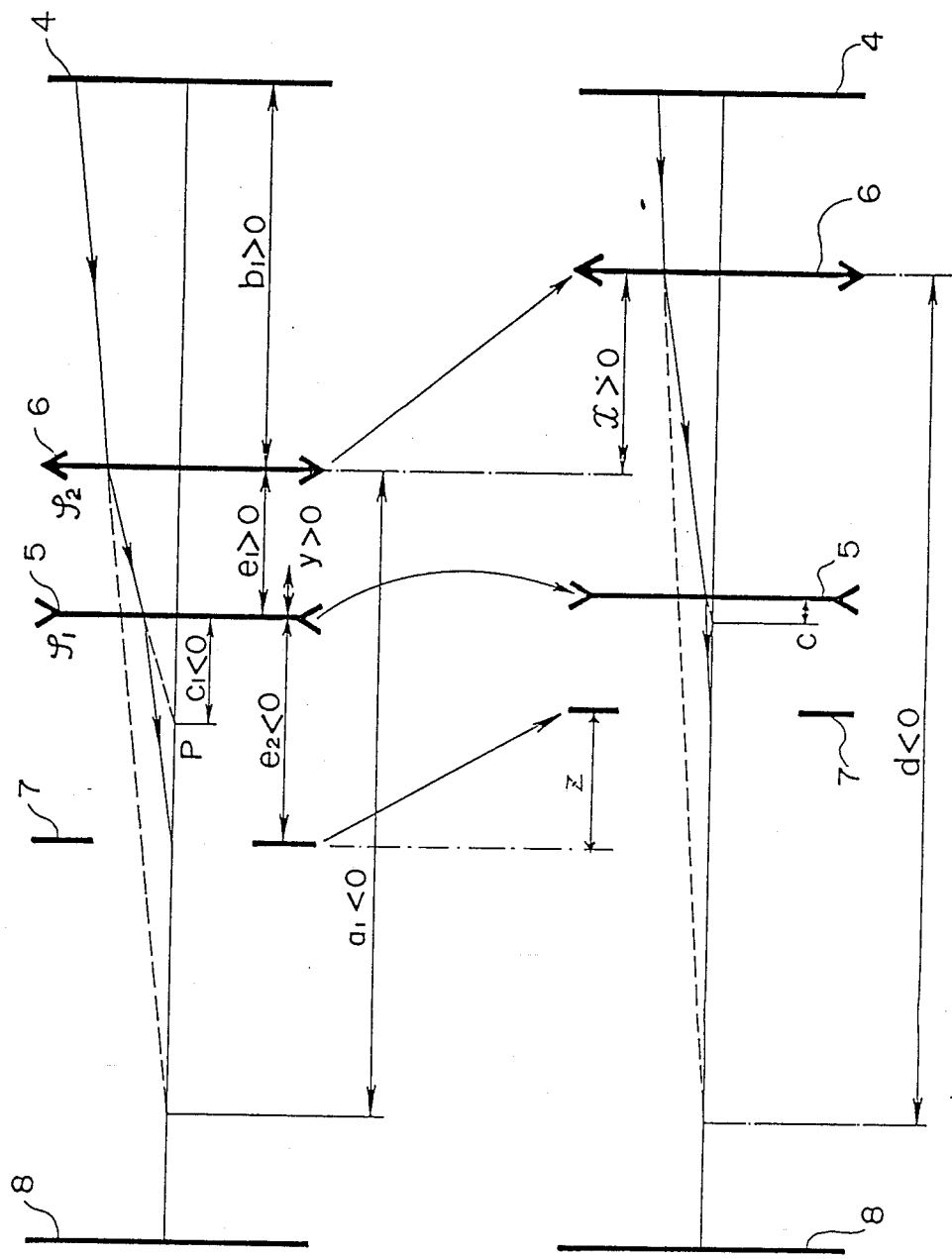

APPARATUS FOR SUPPRESSING BACKWARD PROPAGATION ALONG AN OPTICAL PATH, COMPRISING MAGNETIC CONFIGURATIONS THAT IMPROVE THE FARADAY EFFECT

BACKGROUND OF THE INVENTION

This invention relates to optical isolators for suppressing the light propagating backward along the optical path of an optical system.

When light generated, for example, by a semiconductor laser as a light source is transmitted through an optical fiber, the reflection of light takes place due to the dispersion of the light inside the optical fiber, local nonuniformity of the refractive index of the optical fiber, the connection of the optical fibers and the like, and the reflected light may propagate backward along the optical path and finally recombine with the semiconductor laser. Under such conditions, the oscillation of the semiconductor laser becomes unstable, which results in an undesirable increase in noise in the generated light. Optical isolators can be effectively used to suppress such reflected light.

FIG. 1 illustrates the structure of a conventional optical isolator. The light beam coming from a point "a" in FIG. 1 is converted into a parallel light beam by means of lens 1 and transmitted into a first beam splitter $P_1$ serving as a polarizer. The polarizer $P_1$ selectively permits the light polarized in a certain direction, e.g. the vertically polarized light to pass therethrough. The light passed through the polarizer $P_1$ is then transmitted into a Faraday rotator FR which is constituted by a single crystal of a material such as YIG (an oxide containing $Y_2O_3$, $Fe_2O_3$ as major components), and passes through the Faraday rotator FR with its direction of polarization rotated by 45°. The Faraday rotator FR is usually placed in a center space of a cylindrical magnet 3 as shown in FIG. 1, so that it is magnetized in a direction substantially parallel with the optical path. The light passed through the Faraday rotator FR goes into a second beam splitter $P_2$ serving as an analyzer, whose polarization angle is deviated by 45° from a vertical direction. Consequently, the light exiting from the Faraday rotator FR can pass through the analyzer $P_2$ without further changing its plane of polarization, and is focused at point "b" after it has passed through lens 2. Therefore, if an end of an optical fiber is placed at point "b", the light coming from point "a" can be introduced into the optical fiber.

On the other hand, the light reflected in the optical fiber, etc. is transmitted from point "b" into the second beam splitter $P_2$ which serves as a polarizer this time, via lens 2. The component of the reflected light polarized in the same direction as the polarization direction of polarizer $P_2$ passes through the polarizer $p_2$ and goes into the Faraday rotator FR. As is well known, the Faraday rotator FR changes the plane of polarization of light passing through it, depending upon the angle of the incident light relative to the direction of magnetization of the Faraday rotator. In the arrangement shown in FIG. 1 since the light is rotated by 45° in the same direction as the incident light, the resultant direction of polarization of the light exiting leftward from the Faraday rotator FR is perpendicular to the direction in which the first beam splitter $P_1$, which functions as an analyzer this time, permits a light to pass. Hence, the reflected light propagating backward from the Faraday rotator FR toward the semiconductor laser is blocked by the analyzer $P_1$, thereby preventing the decrease of S/N ratio of the semiconductor laser, which would otherwise be caused by the recombination of the reflected light with the semiconductor laser.

In a conventional optical isolator as shown in FIG. 1, Rochon prisms or Glan-Thompson prisms are used as beam splitters serving as polarizers and analyzers $P_1$, $P_2$, respectively. The extinction ratios of these prisms are reportedly at most approximately 50 dB. The extinction ratios of the aforementioned single crystal materials such as YIG and GBIG (oxide consisting essentially of $Gd_2O_3$, $Bi_2O_3$, $Y_2O_3$ and $Fe_2O_3$) used for Faraday rotators are also reportedly about 40 dB. The loss in a reverse direction, or simply reverse loss of an optical isolator which comprises some of these components in combination is limited due to negative interference of the components. Thus, the reverse loss of such an optical isolator for single wavelength light is generally about 30 dB.

The study of coherent optical communications has been actively conducted recently, as optical communications are getting higher in density and speed. It has been pointed out that in such coherent optical communications the loss of an optical isolator in a reverse or backward direction would be insufficient if it is 30 dB or so, and that it must be at least double, namely, 60 dB or so. Therefore, a single-stage optical isolator as shown in FIG. 1 is insufficient, and so the use of a double-stage isolator is expected. In principle this makes it possible to double the reverse loss to 60 dB. However, when two such isolators are simply combined as in FIG. 2, the distance between the laser diode side "a" and the optical fiber side "b" becomes so great that the resultant coupling efficiency of the two isolators becomes extremely low. If the two isolators, i.e. two permanent magnets $3a$ and $3b$, are approached each other in an effort to avoid this problem, the opposing faces of the magnets $3a$, $3b$ attract each other and weaken the magnetic field to be applied to the Faraday rotators, though the overall size of the optical isolator is reduced. In some cases the rotators FR-1, FR-2 become unsaturated, so that they can no longer maintain their own isolating power.

In addition, the plane of polarization is rotated by 90° from the incident light beam to the exiting light beam, so that the polarization angle of an optical system on the exit side "b" must be set perpendicular to that on the laser diode side "a".

Therefore, one way to increase the reverse loss of an optical isolator without suffering from the above problems is to improve the performance of each component in an optical isolator. Among others, the optimum size of the cylindrical serious attention to the fact that if the magnetic field applied to the Faraday rotator FR is nonuniform, the rotating power of the Faraday rotator differs from place to place in the above element, causing decrease of the extinction ratio. The extinction ratio also decreases if the magnetic field does not have sufficient intensity, since Faraday rotators become unsaturated.

To eliminate these problems, a large-scale Faraday rotator may be used, but it does not meet a requirement for the compact optical isolator. In order to obtain the best optical isolator, it is necessary to use as small a magnet as possible within a permissible range of extinction ratios.

In the conventional optical isolators, almost no attention has been paid to the optimum size of a permanent magnet for gaining a high reverse loss. It is, therefore, an object of this invention to determine the optimum size thereby providing a high-performance optical isolator comprising a cylindrical magnet having an optimum size.

Another way to increase the reverse loss of an optical isolator without suffering from the above problems is to provide a special construction of a multi-stage optical isolator.

Conventional multi-stage optical isolators are not only large in size but also disadvantageous in that the plane of polarization of light is rotated by 90°.

Thus, it is another object of this invention to solve these problems, thereby providing a compact, yet high-performance multi-stage optical isolator.

SUMMARY OF THE INVENTION

An optical isolator according to the present invention comprises a cylindrical magnet magnetized in a direction parallel to the axis of rotational symmetry thereof, a Faraday rotator disposed in a center space of the cylindrical magnet, a pair of beam splitters capable of serving as polarizers and analyzers and arranged on both sides of the Faraday rotator with inclination of 45° relative to each other, characterized in that the outer diameter Do, the inner diameter Di and the thickness L of said cylindrical magnet are in the range defined by $$0.9 \frac{\alpha^{2/3}}{\sqrt{\alpha^{2/3} + 1}} \leq \frac{L}{Di} \leq 1.1\alpha^{2/5} \sqrt{\frac{\alpha^{6/5} - 1}{\alpha^{4/5} - 1}}$$

where $\alpha = Do/Di$.

A multi-stage optical isolator according to the present invention comprises N Faraday rotators, N cylindrical magnets each accommodating each of the Faraday rotators, N+1 beam splitters each of which can function as a polarizer and an analyzer, characterized in that the Faraday rotators and the beam splitters are arranged alternately in tandem in such a way that each Faraday rotator is disposed between adjacent two beam splitters; that the N cylindrical magnets are magnetized in the direction of the optical axis; and that any two adjacent cylindrical magnets are arranged such that their magnetic poles of the same polarity face each other.

DESCRIPTION OF THE PREFERRED EMBODIMENTS

Figure 3:
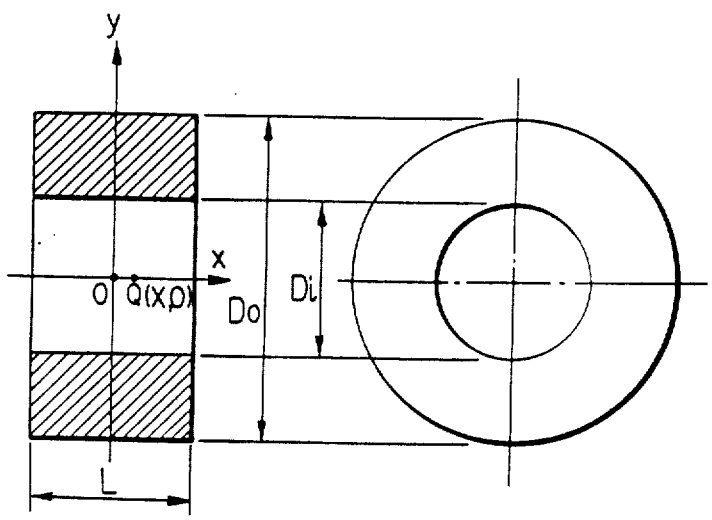
FIG. 3 is a cross-sectional view of a cylindrical magnet.

FIG. 3 is a cross-sectional view of a cylindrical magnet for illustrating the principle of the present invention. assuming that $Do = 2ro$, $Di = 2ri$ and $L = 2l$ are the outer diameter, the inner diameter and the thickness of the cylindrical magnet, respectively, the intensity of the magnetic field at an arbitrary point Q(X, O) on the axis of rotational symmetry of the cylindrical magnet is given by $$H = \frac{Br}{2} \sum_{+,-} \frac{(l \pm x)/ri}{\sqrt{1 + (l \pm x)^2/ri^2}} - \frac{(l \pm x)/ro}{\sqrt{1 + (l \pm x)^2/ro^2}} \quad (1)$$

where Br is a residual magnetic flux density inherent to the magnetic material used. For a special case of $X = 0$, the magnetic field at the center is given simply by $$H = Br \left[ \frac{l/ri}{\sqrt{1 + (l^2/ri^2)}} - \frac{l/ro}{\sqrt{1 + (l^2/ro^2)}} \right] \quad (2)$$

Figure 4:
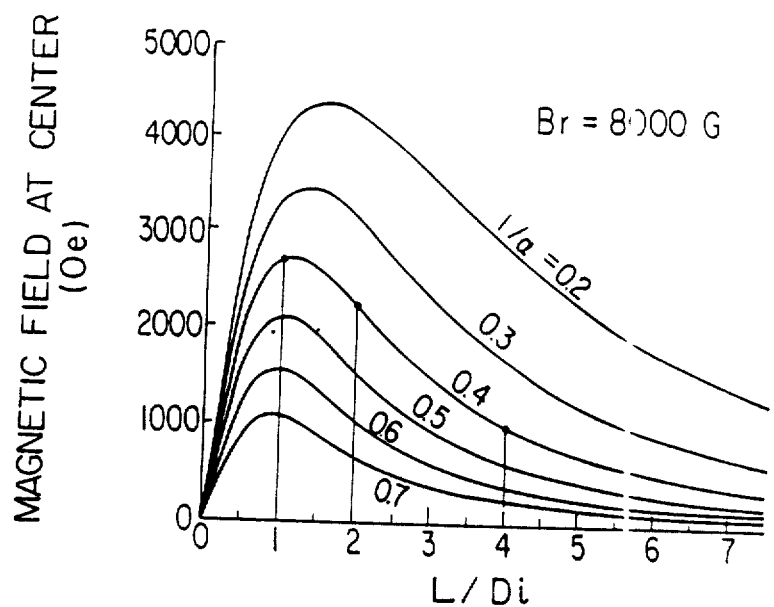
FIG. 4 is a graph showing the dependency of the intensity of magnetic field at the center of the cylindrical magnet on the thickness of the cylindrical magnet.

The values of H calculated for Br = 8000 Gauss and $\alpha = Do/Di$ are shown in FIG. 4. The abscissa indicates L/Di, i.e. the thickness L normalized by the inner diameter Di. It will be understood from this graph that as the thickness increases for a given inner diameter, the magnetic field at the center reaches a maximum at a certain thickness Lm. The value of Lm varies with the ratio of the outer diameter to the inner diameter The larger $\alpha$, the larger Lm. This relation can be obtained by first differentiating Eq. (2) by l and then equating the differential coefficient to 0:

$$\frac{Lm}{Di} = \frac{\alpha^{2/3}}{\sqrt{\alpha^{2/3} + 1}} \quad (3)$$

In actuality, it is not limited to this point and the range of ±10% near the above value is acceptable for obtaining a maximum magnetic field. Since the intensity of the magnetic field rapidly decreases as the thickness decreases below the above range, it would be inappropriate to construct a stable optical isolator having a thickness less than this limit. On the other hand, although the intensity of the magnetic field decreases with the increase in thickness above the optimum value, such decrease of the intensity of magnetic field is not so significant.

Figures 1A, 1B:
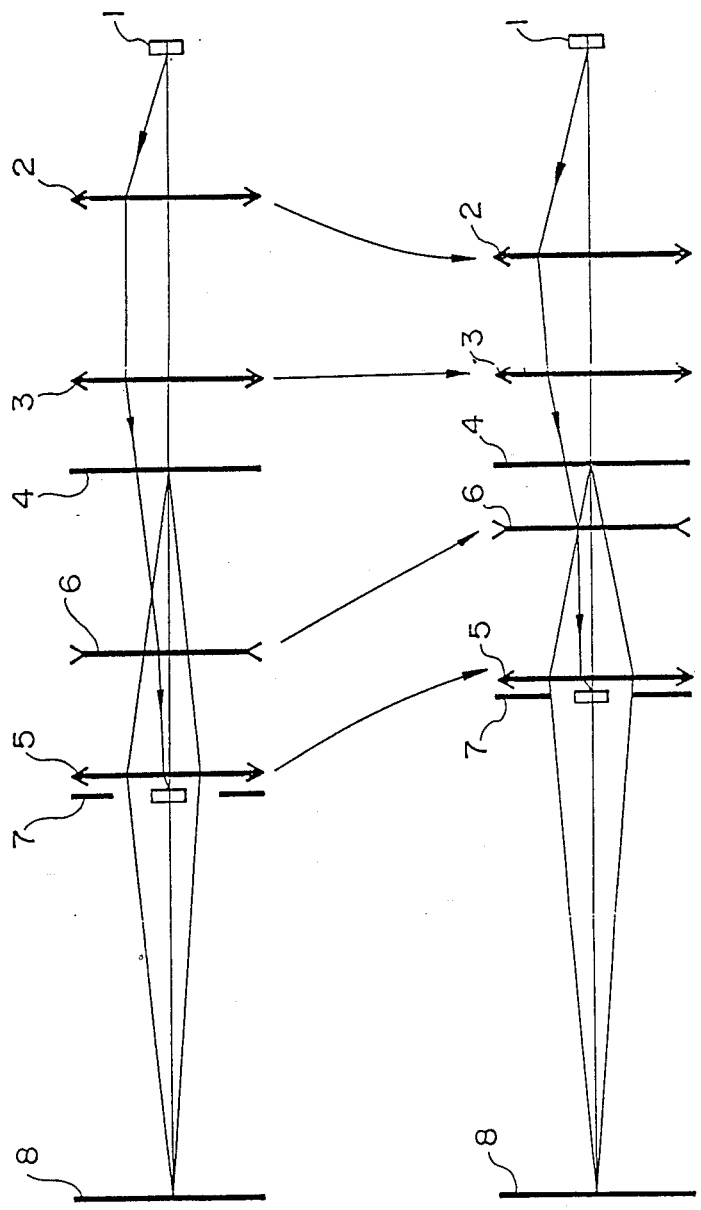
FIGS. 1 and 2 are cross-sectional views of conventional optical isolators.
Figure 6:
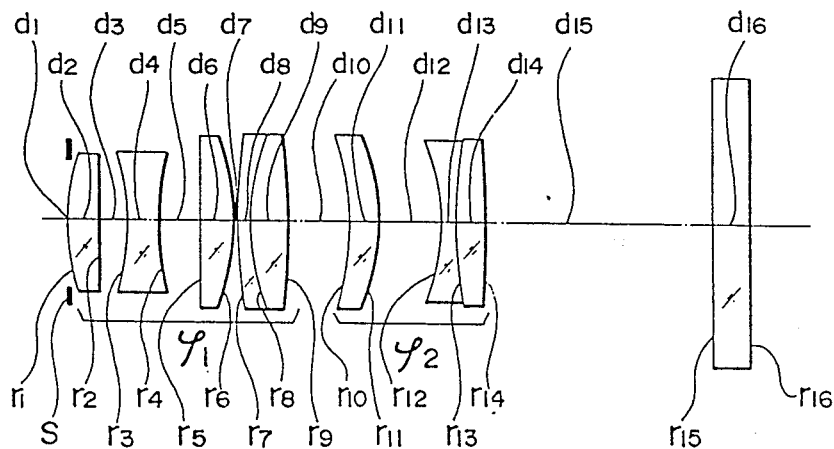
FIG. 5, 6 and 7 are graphs showing the relationships between the magnetic field distribution and the thickness, respectively.
Figure 7:
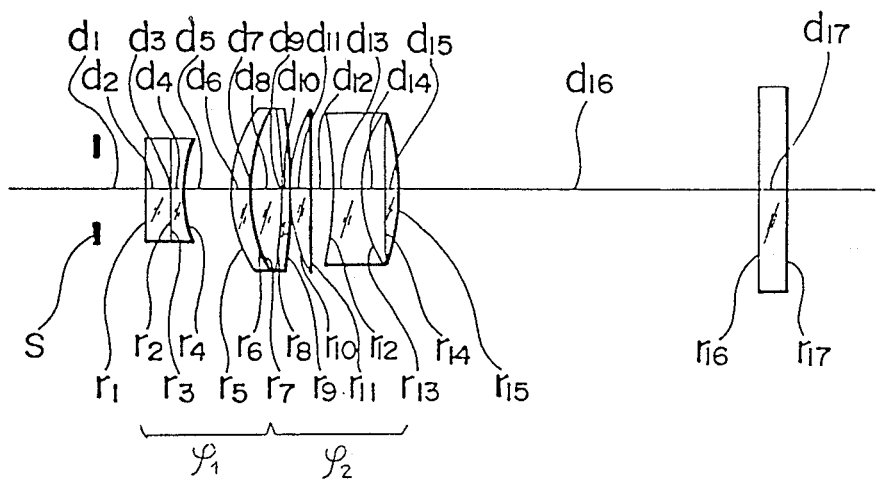
Figure 5:
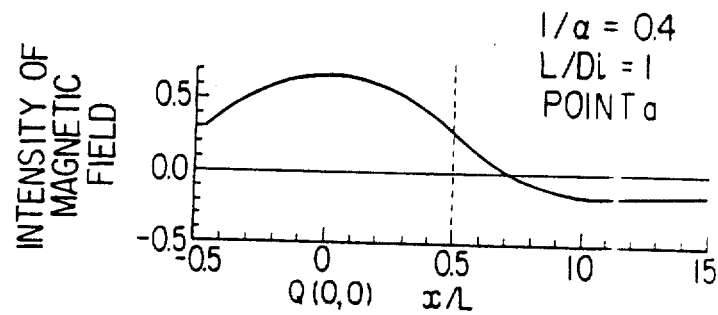
Figure 6:
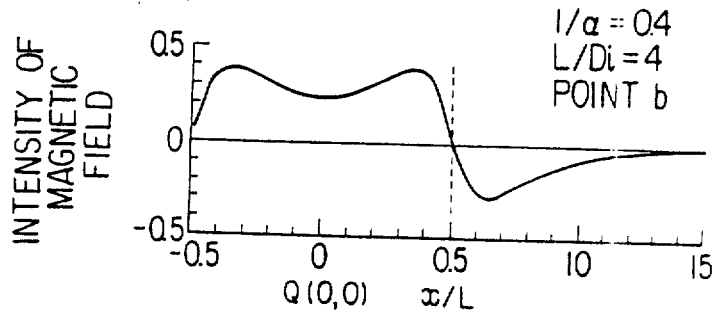
Figure 7:
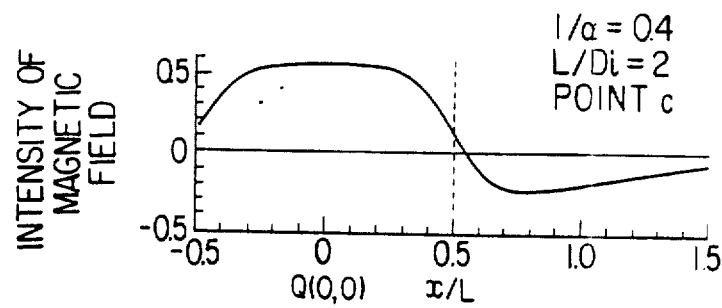

Numerically calculated distributions of the magnetic field along the x axis for $\alpha = 2.5$ are shown in FIGS. 5, 6 and 7, in which L/Di is 1, 4 and 2, respectively. These graphs show that the distribution has a single-peak configuration for small L, but has a double-peak configuration for large L. In practice a uniform magnetic field over a wide range is desirable. Therefore, what is important is to determine the value of L at which the distribution makes a transition from a single-peak configuration to a double-peak configuration. This value of L is larger than the value of L giving the maximum magnetic field, so that the magnetic field is then a little weaker than the maximum at that value. Nevertheless, it is desirable to have a uniform magnetic field even though some intensity is sacrificed. The transition point can be obtained by differentiating Eq. (1) twice by x and equating it to zero. The transition point Lw from a single-peak distribution to a double-peak distribution has the following relationship with α:

$$\frac{Lw}{Di} = \alpha^{2/5} \sqrt{\frac{\alpha^{6/5} - 1}{\alpha^{4/5} - 1}} \quad (4)$$

In actuality, a substantially uniform magnetic field can be obtained not only at this point but also in the range of ±10% near the above Lw/Di. For the thickness exceeding this, the magnetic field rapidly loses its intensity, so that it is difficult to make a stable isolator having a thickness greater than this. On the other hand, thickness less than this is preferable in realizing an intense magnetic field.

In sum, it is concluded based on Eqs. (3) and (4) that since the magnetic field to be applied to a Faraday rotator should be as strong as possible, and since its axial distribution should be as uniform as possible, an optimum size of the cylindrical magnet satisfying these two conditions is in the range derived from equations (3) and (4). Thus, including the vicinity of the above limits (±10%), the cylindrical magnet according to the present invention desirably satisfies the following inequality:

$$0.9 \frac{\alpha^{2/3}}{\sqrt{\alpha^{2/3} + 1}} \leq \frac{L}{Di} \leq 1.1 \alpha^{2/5} \sqrt{\frac{\alpha^{6/5} - 1}{\alpha^{4/5} - 1}} \quad (5)$$

Figure 8:
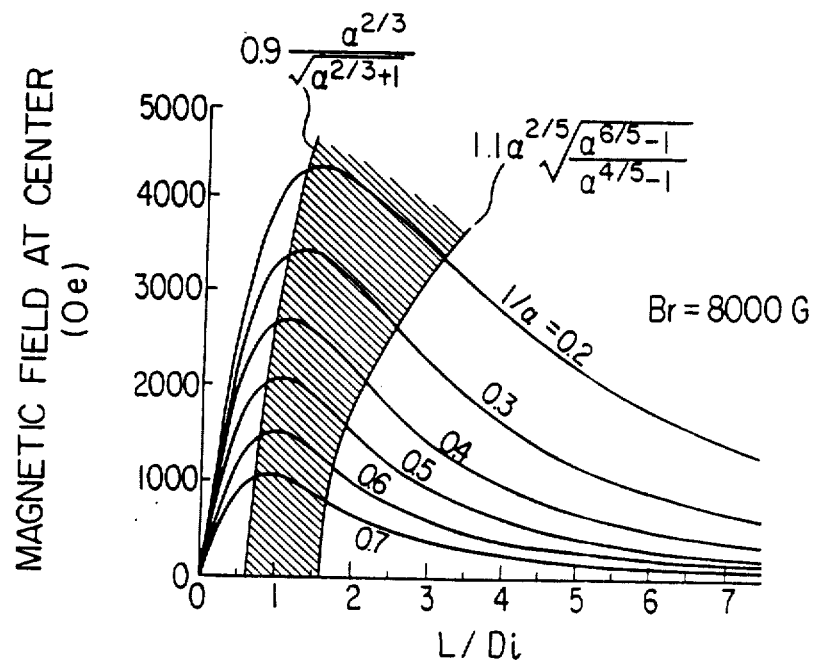
FIG. 8 is a graph showing the useful range of L/Di.

Table 1 lists upper and lower limits of L/Di defined by (5) for different values of α. Values in the parentheses in Table 1 are those calculated from Eqs. (3) and (4). The optimum range is schematically shown by a shaded area in FIG. 8.

TABLE 1

| α | Lower Limit of L/Di | Upper Limit of L/Di |
|---|---|---|
| 1/0.2 = 5 | 1.33(1.48) | 3.14(2.85) |
| 1/0.3 = 3.33 | 1.12(1.24) | 2.52(2.29) |
| 1/0.4 = 2.5 | 0.98(1.09) | 2.16(1.96) |
| 1/0.5 = 2 | 0.89(0.99) | 1.92(1.75) |
| 1/0.6 = 1.67 | 0.81(0.90) | 1.75(1.59) |
| 1/0.7 = 1.43 | 0.76(0.84) | 1.61(1.43) |
| 1.0 | 0.64(0.71) | 1.00(1.10) |

Figure 1:
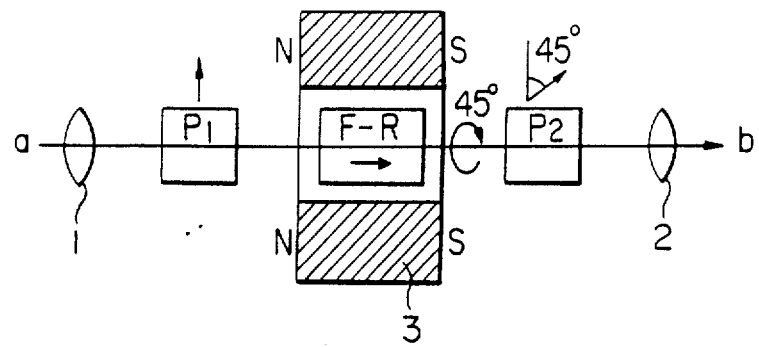

Another embodiment will be shown, in which an optical isolator for a wavelength of 1.55 μm is designed based on the above result. Table 2 shows the extinction ratio of the optical isolator having the structure shown in FIG. 1 for various thicknesses of the cylindrical magnet in which α=1/0.4, Di=5 mm and Do=12.5 mm. The Faraday rotator FR is a 2.52 mm-long YIG single crystal coated with AR on both surfaces.

TABLE 2

| No. | Do (mm) | Di (mm) | 1/α | L (mm) | L/Di | Extinction Ratio (dB) |
|---|---|---|---|---|---|---|
| 1 | 12.5 | 5.0 | 0.4 | 2.5 | 0.5 | 25 |
| 2* | " | " | " | 6.25 | 1.25 | 35 |
| 3 | " | " | " | 15 | 3.0 | 20 |

Note
*Present Invention

This result shows that the extinction ratio drops to less than 30 dB outside the optimum region, i.e. when L/Di=0.5 and 3.0. However, the extinction ratio exceeds 30 dB in the optimum region in which L/Di=1.25.

Figure 9:
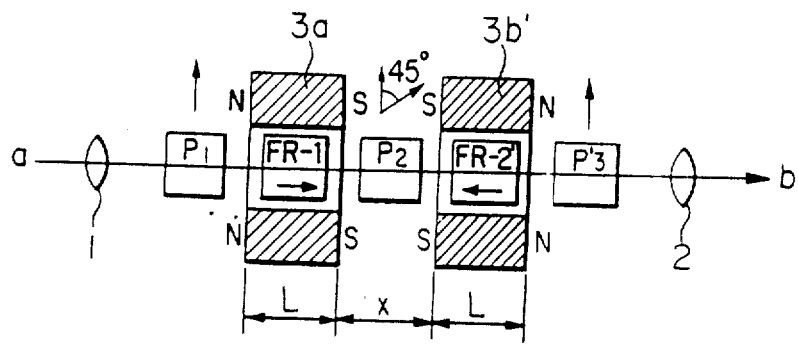
FIGS. 9, 10 and 13 are cross-sectional views of multistage optical isolators according to the present invention.

Now turning to a multi-stage optical isolator, FIG. 9 illustrates the structure of a two-stage optical isolator according to a preferred embodiment of the present invention, in which two cylindrical magnets 3a, 3b' having the same length L but magnetized in opposite directions are coaxially arranged with their S poles opposing each other with a certain distance X. Beam splitters $P_1$, $P_2$ and $P_3'$ which can serve as polarizers and analyzers as well are arranged as shown in FIG. 9. Beam splitter $P_1$ on the incident beam side and beam splitter $P_3'$ on the exit beam side are arranged such that their planes of polarization are oriented in the same direction, i.e. at 0°. The beam splitter $P_2$ between two Faraday rotators FR-1 and FR-2' has a direction of polarization of 45°. With this construction, the light beam entering into this optical isolator through the point "a" is rotated by 45° by Faraday rotator FR-1, passes through beam splitter $P_2$ serving as an analyzer having a polarization angle inclined by 45°, and goes into the second Faraday rotator FR-2', through which the plane of polarization of the light beam is rotated by 45° in the opposite direction because of the opposite direction of magnetization of the rotator FR-2'. Namely, the light recovers its initial direction of polarization which it had at point "a". Thus, it passes through analyzer $P_3'$ directed substantially at 0°. The direction of this propagation is regarded as a forward direction of the optical isolator. In this embodiment of the present invention, the isolator permits the light to pass through it without changing its plane of polarization, and hence has very low insertion loss, namely low loss in the forward direction. This is a great advantage of this invention compared with conventional isolators which must take count of 45° or 90° rotation in the designing of optical systems. Further advantage of the invention is that by closely disposing two S poles, the magnetic field acting upon the Faraday rotators is enhanced compared with a case where a single-stage optical isolator is used.

On the other hand, the light entering through point "b" is oppositely rotated by 45° in Faraday rotator FR-2' and its plane of polarization becomes perpendicular to the polarization direction of analyzer $P_2$ through which the light can pass. The reverse loss of 30 dB is attained at this stage. The light which has passed through analyzer $P_2$ is then rotated forwardly by 45° by Faraday rotator FR-1, so that it becomes perpendicular to the direction of polarization of analyzer $P_1$. Thus, the light is further attenuated by 30 dB. Accordingly the total attenuation amounts to 60 dB.

Figure 2:
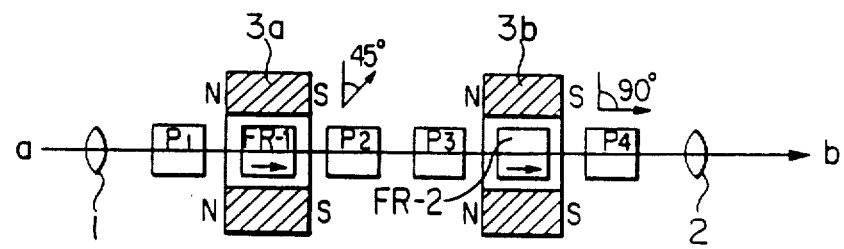
Figure 10:
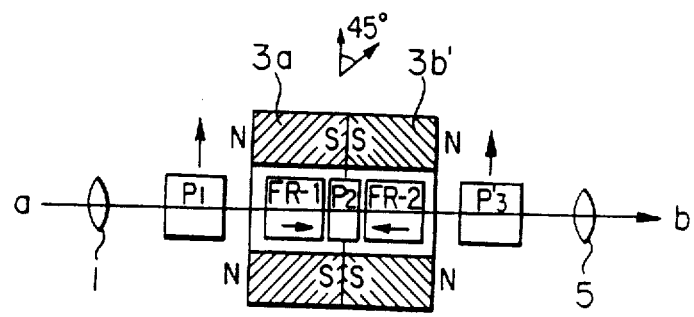

FIG. 10 shows another embodiment of the present invention for effectively enhancing the magnetic field. In this example, the distance X between the two cylindrical magnets is zero, i.e. they are in close contact with each other. In order to realize this construction, however, the central analyzer $P_2$ must be made as thin as possible like a film. In conventional apparatus too, such as shown in FIG. 2 the two magnets theoretically can be arranged in close contact with each other. However, in such a configuration, the opposing magnetic poles would tend to cancel each other, since they have opposite polarities. Consequently, the coupled magnets are equivalent to a single, long magnet, so that the magnetic field acting on Faraday rotators FR-1 and FR-2 becomes extremely weak.

Figure 11:
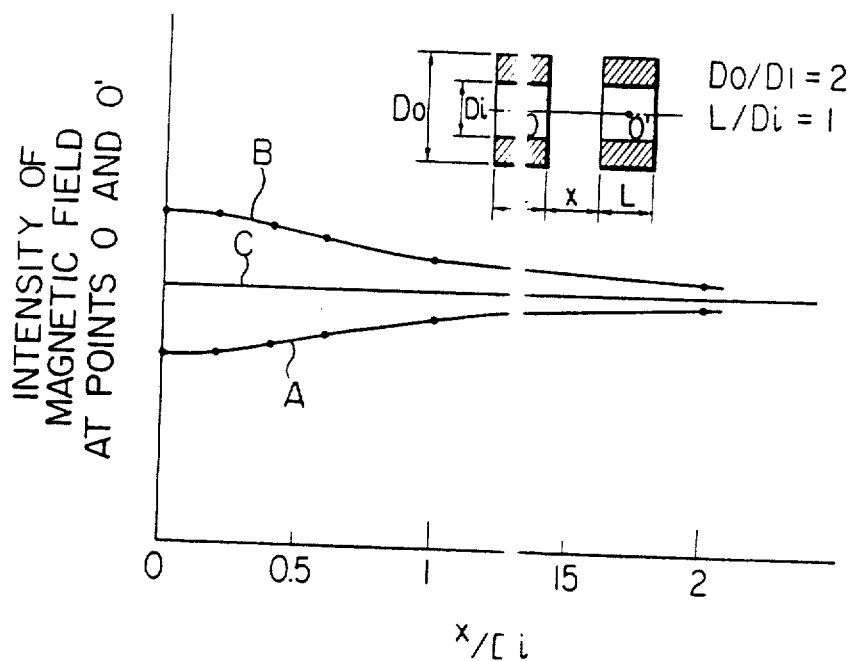
FIGS. 11 and 12 are graphical representations of the enhancing effect of the magnetic field according to the present invention.

FIG. 11 graphically shows the results of numerical calculations of the intensity of magnetic field to clarify such relations. The ordinate of the graph indicates the intensity of magnetic field at the centers O and O' of the two magnets, and the abscissa indicates the distance X between the two magnets normalized by the inner diameter Di of each magnet. The absolute intensity of magnetic field at O and O' are the same since the configuration is symmetrical. Their directions of magnetic flux are the same when S and N poles are faced as in the conventional case. However, their directions of magnetic flux are opposite in the present invention, since the magnetic poles of the same polarity are facing each other. In numerical calculations, parameters have been chosen as follows; Do/Di=2, and L/Di=1. The straight line C indicates the intensity of magnetic field at centers when the two magnets are sufficiently separated. In this case, the intensity of magnetic field is equal to that of a single magnet. The line A represents the magnetic field of the conventional magnets, showing that the magnetic field becomes weaker as the two magnets approaches In contrast, the magnetic field as indicated by line B representing the present invention becomes more intense as the two magnets approaches. Comparing A and B at a point of X=0 where the difference between them is most significant, the intensity of B is nearly twice that of A. Therefore, it is apparent that if each magnet is magnetized almost to its saturation level, the two-stage isolator constructed in a conventional manner cannot maintain its performance. In contrast, the optical isolator according to the present invention generates an enhanced magnetic field, which makes it possible to approach the limit of designing an efficient isolator.

Figure 12:
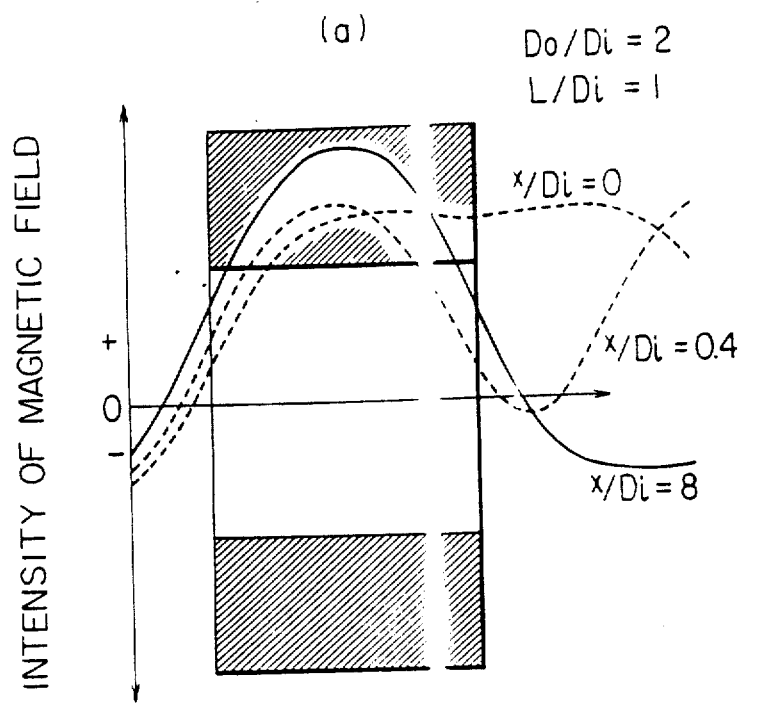
Figure 12:
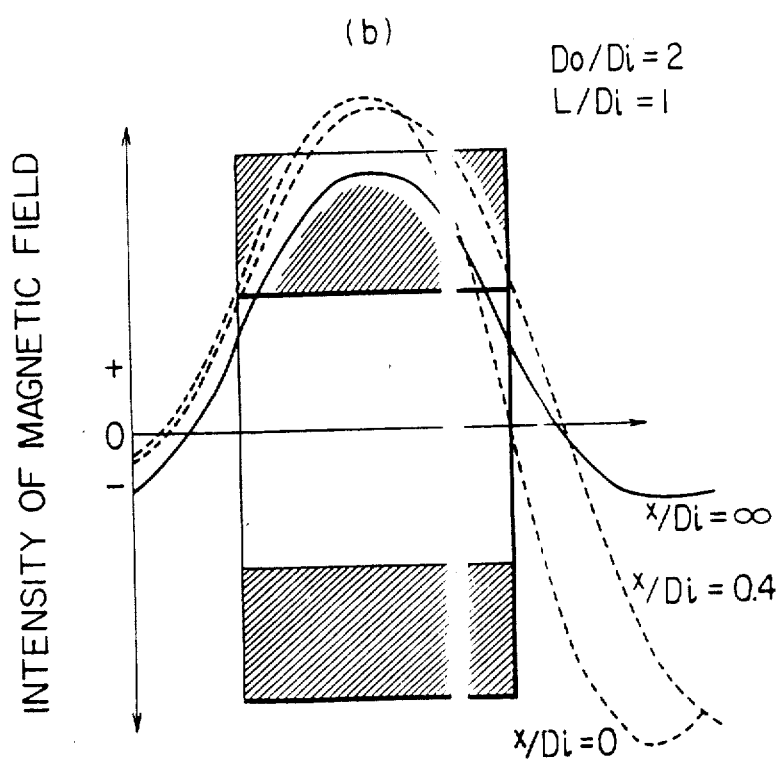

FIG. 12 is a graph of a numerically calculated distribution of the magnetic field along the optical axis for X/Di=0, 0.4 and ∞, graphically showing the above-mentioned field enhancement effect. The figure shows the magnetic field distribution only in the vicinity of the center of the left cylindrical magnet. Parameters used in the calculation are the same for FIG. 11. Negativity of the field represents the reversal of the direction of the magnetic field. Part (a) of the figure refers to the conventional isolator, and Part (b) to that of the present invention. In the conventional case, the intensity of magnetic field is generally lowered except in some small region when the distance between the two magnets decreases. On the other hand, in the optical isolator according to the present invention, the magnetic field is enhanced except for in some small region, when the distance X/Di decreases to zero. Since a Faraday rotator never extends to this region, it does not pose any problem in the actual utilization of the present invention. To avoid a magnetic field decrease in side regions of the cylindrical magnets, it is preferable in the present invention to arrange the two magnets slightly apart from each other, e.g. X/Di=0.4 or so, rather than to put them in close contact with each other.

Figure 13:
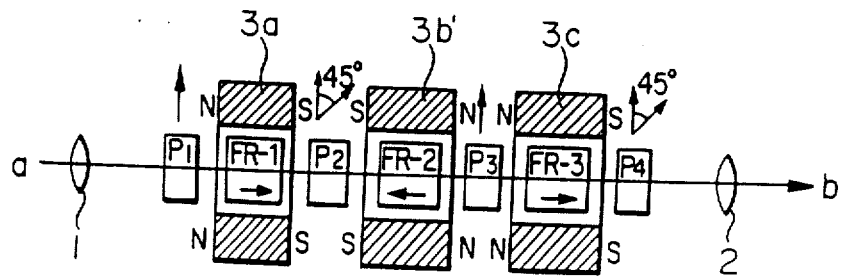

FIG. 13 illustrates a multi-stage optical isolator according to another embodiment of the present invention, which comprises three units in tandem. As shown in FIG. 13, there are provided 3 cylindrical magnets in such a way that adjacent cylindrical magnets have their magnetic poles of the same polarity opposing each other, i.e., S pole of one magnet are opposed with S pole of an adjacent one, and the same is true for N poles. In this arrangement two Faraday rotators FR-1 and FR-3 are magnetized in the same direction, and 4 beam splitters $P_1$, $P_2$, $P_3$ and $P_4$ capable of serving as polarizers and analyzers are provided alternately with the above three Faraday rotators. Analyzer $P_4$ is optically inclined by 45° like analyzer $P_2$. In this example, one of the advantageous merits of the present invention of retaining the original direction of polarization of light cannot be obtained. Nevertheless, this embodiment is significant in that the enhancement of the magnetic field can be attained in the central portions of magnets. Furthermore, by constructing the isolator with three units in tandem, reverse loss can be raised to 90 dB or more. Needless to say, it is clear that a four-stage optical isolator can retain the original direction of polarization of the light beam according to the present invention.

It is also clear to those skilled in the art that although a single beam splitter is used as a polarizer or an analyzer in the above embodiment, a multiplicity of such devices can be used equally well for attaining the same effects.

Furthermore, it is apparent that the above optical isolator can be extended to one having any number of units. Counting the order of polarizer/analyzers starting from one through which the light passes first, the even-order beam splitters (polarizer/analyzers) in such multi-stage optical isolator will give a polarization angle of 45°, while the odd-order ones will give a polarization angle of 0°. The precision required in aligning the optical isolator units is not so critical in the case of multi-stage isolators. An accuracy of ±5° will suffice for practical use of the isolator.

As described above in detail, an optical isolator comprising a compact cylindrical magnet designed to have optimum dimensions in accordance with the present invention is compact in size with high performance.

Moreover, by constructing a multi-stage optical isolator with a plurality of cylindrical magnets with their adjacent magnetic poles having the same polarity, an extremely high loss in reverse or backward direction of the optical isolator can be attained. Therefore, this structure provides a compact, multi-stage optical isolator having high performance.

What is claimed is:

1. An optical isolator comprising a cylindrical magnet magnetized in a direction parallel to the axis of rotational symmetry thereof, a Farady rotator disposed in a center space of said cylindrical magnet, a pair of beam splitters capable of serving as a polarizer or an analyzer arranged on both sides of said Faraday rotator with inclination of 45° relative to each other, characterized in that the outer diameter Do, the inner diameter Di and the length L of said cylindrical magnet are in the range defined by $$0.9 \frac{\alpha^{2/3}}{\sqrt{\alpha^{2/3} + 1}} \leq \frac{L}{Di} \leq 1.1\alpha^{2/5} \sqrt{\frac{\alpha^{6/5} - 1}{\alpha^{4/5} - 1}}$$

where $\alpha = Do/Di$.

2. A multi-stage optical isolator comprising N Faraday rotators, wherein N is an integer equal to 3 or more, N cylindrical magnets each accommodating each of said rotators, and N+1 beam splitters capable of serving as a polarizer or an analyzer, characterized in that said Faraday rotators and said beam splitters are arranged alternately in tandem; that said N cylindrical magnets are magnetized in the direction of the optical axis; and that any two adjacent cylindrical magnets are arranged with their magnetic poles of the same polarity facing each other.

3. The multi-stage optical isolator according to claim 2, wherein assuming that the first beam splitter on the side of incident light has a polarization angle of about 0°, the angle of the plane of polarization of the even beam splitters is within 45°±5° with reference to the polarization angle of the first beam splitter, while the polarization angle of the odd beam splitters is within 0±5°; wherein the "odd" beam splitters are defined as the sequentially alternate beam splitters beginning with, and including, said first beam splitter, and the "even" beam splitters are the remaining beam splitters.

4. A multi-stage optical isolator comprising N Faraday rotators, N cylindrical magnets reach accommodating each of said rotators, an N+1 beam splitters capable of serving as a polarizer or an analyzer, characterized in that said Faraday rotators and said beam splitters are arranged alternately in tandem; that said N cylindrical magnets are magnetized in the direction of the optical axis; and that any two adjacent cylindrical magnets are arranged with their magnetic poles of the same polarity facing each other, wherein N is an integer equal to 2 or more, and wherein the inner diameter $D_i$ and the separation x between said two adjacent cylindrical permanent magnets satisfies the relationship $x/D_i \leq 1.0$.

5. The multi-stage optical isolator according to claim 4 wherein $0.4 \leq x/D_i \leq 1.0$.

6. The multi-stage optical isolator according to claim 4, wherein assuming that the first beam splitter on the side of incident light has a polarization angle of about 0°, the angle of the plane of polarization of the even beam splitters is within 45°±5° with reference to the polarization angle of the first beam splitter, while the polarization angle of the odd beam splitters is within 0±5°; wherein the "odd" beam splitters are defined as the sequentially alternate beam splitters beginning with, and including, said first beam splitter, and the "even" beam splitters are the remaining beam splitters.

* * * * *

UNITED STATES PATENT AND TRADEMARK OFFICE
CERTIFICATE OF CORRECTION

PATENT NO. : 4,865,429

DATED : September 12, 1989

INVENTOR(S) : Takeda, et al

It is certified that error appears in the above-identified patent and that said Letters Patent is hereby corrected as shown below:

The title page should be deleted to appear as per attached title page.

The sheets of drawings Figs. 1-7 should be deleted and replaced with Figs. 1-13.

Signed and Sealed this

Twenty-ninth Day of January, 1991

Attest:

HARRY F. MANBECK, JR.

Attesting Officer

Commissioner of Patents and Trademarks

United States Patent [19]

Takeda et al.

[11] Patent Number: 4,865,429
[45] Date of Patent: Sep. 12, 1989

[54] APPARATUS FOR SUPPRESSING BACKWARD PROPAGATION ALONG AN OPTICAL PATH, COMPRISING MAGNETIC CONFIGURATIONS THAT IMPROVE THE FARADAY EFFECT

[75] Inventors: Shigeru Takeda; Satoshi Makio, both of Kumagaya, Japan

[73] Assignee: Hitachi Metals, Ltd., Tokyo, Japan

[21] Appl. No.: 156,845

[22] Filed: Feb. 17, 1988

[30] Foreign Application Priority Data

Feb. 17, 1987 [JP] Japan ................................ 62-34165
Feb. 27, 1987 [JP] Japan ................................ 62-44469

[51] Int. Cl.⁴ .............................................. G02F 1/09
[52] U.S. Cl. ............................................... 350/375
[58] Field of Search ............... 350/355, 375, 376, 377, 350/378

[56] References Cited

FOREIGN PATENT DOCUMENTS 57-62024  4/1982  Japan .................................. 350/375

*Primary Examiner*—Bruce Y. Arnold
*Assistant Examiner*—David J. Edmondson
*Attorney, Agent, or Firm*—Finnegan, Henderson, Farabow, Garrett & Dunner

[57] ABSTRACT

An optical isolator comprising a cylindrical magnet magnetized in a direction parallel to the axis of rotational symmetry thereof, a Faraday rotator disposed in a center space of the cylindrical magnet, a pair of beam splitters capable of serving as a polarizer or an analyzer arranged on both sides of said Faraday rotator with inclination of 45° relative to each other, characterized in that the outer diameter Do, the inner diameter Di and the length L of the cylindrical magnet are in the range defined by $$0.9 \frac{\alpha^{2/3}}{\sqrt{\alpha^{2/3}+1}} \leq \frac{L}{Di} \leq 1.1 \alpha^{2/5} \sqrt{\frac{\alpha^{6/5}-1}{\alpha^{4/5}-1}}$$

where $\alpha = Do/Di$.

In the case of a multi-stage optical isolator, the Faraday rotators and the beam splitters are arranged alternately in tandem, and any two adjacent cylindrical magnets are arranged with their magnetic poles of the same polarity facing each other.

6 Claims, 6 Drawing Sheets

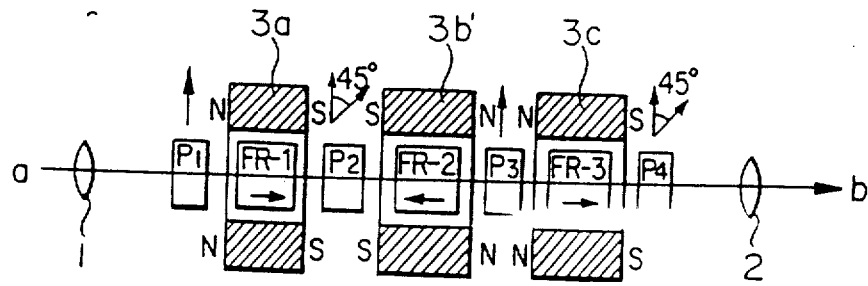

(a) $D_o/D_i = 2$, $L/D_i = 1$ (b) $D_o/D_i = 2$, $L/D_i = 1$

UNITED STATES PATENT AND TRADEMARK OFFICE
CERTIFICATE OF CORRECTION

PATENT NO. : 4,865,429

DATED : September 12, 1989

INVENTOR(S) : SHIGERU TAKEDA ET AL.

It is certified that error appears in the above-identified patent and that said Letters Patent is hereby corrected as shown below:

Column 9, line 13 (Claim 4, line 2), change "reach" to --each--.

Column 9, line 14 (Claim 4, line 3), change "an" to --and--.

Signed and Sealed this

Twelfth Day of November, 1991

Attest:

*Attesting Officer*

HARRY F. MANBECK, JR.

*Commissioner of Patents and Trademarks*